(12) United States Patent
Yoo et al.

(10) Patent No.: US 8,042,144 B2
(45) Date of Patent: Oct. 18, 2011

(54) INTERACTIVE MEDIUM AND METHOD FOR MANAGING ADDITIONAL DATA THEREOF

(75) Inventors: Jea Yong Yoo, Seoul (KR); Woo Seong Yoon, Kamyangjoo-si (KR); Limonov Alexandre, Seoul (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1105 days.

(21) Appl. No.: 10/793,912

(22) Filed: Mar. 8, 2004

(65) Prior Publication Data

US 2004/0177385 A1 Sep. 9, 2004

(30) Foreign Application Priority Data

Mar. 6, 2003 (KR) .................. 10-2003-0014162

(51) Int. Cl.
*H04N 7/173* (2006.01)
(52) U.S. Cl. .......................... 725/132; 725/142
(58) Field of Classification Search .................. 725/132, 725/142
See application file for complete search history.

(56) References Cited

U.S. PATENT DOCUMENTS

| 5,269,698 | A | * | 12/1993 | Singer ......................... 439/157 |
| 5,517,250 | A | * | 5/1996 | Hoogenboom et al. .. 375/240.27 |
| 5,907,658 | A | * | 5/1999 | Murase et al. ................. 386/248 |
| 5,929,857 | A | | 7/1999 | Dinallo et al. |
| 6,229,523 | B1 | | 5/2001 | Czako |
| 6,313,850 | B1 | | 11/2001 | Czako |
| 6,564,255 | B1 | * | 5/2003 | Mobini et al. ................. 709/219 |
| 2001/0038745 | A1 | * | 11/2001 | Sugimoto et al. .............. 386/95 |
| 2002/0055949 | A1 | * | 5/2002 | Shiomi et al. .................. 707/500 |
| 2002/0078144 | A1 | * | 6/2002 | Lamkin et al. ................. 709/203 |
| 2002/0088011 | A1 | | 7/2002 | Lamkin et al. |
| 2003/0028899 | A1 | * | 2/2003 | MacInnis ....................... 725/132 |
| 2003/0048671 | A1 | | 3/2003 | Yoshikawa et al. |
| 2003/0081944 | A1 | * | 5/2003 | Kim et al. ..................... 386/125 |
| 2003/0084460 | A1 | * | 5/2003 | Chung et al. .................. 725/142 |
| 2003/0133702 | A1 | * | 7/2003 | Collart ........................... 386/125 |
| 2003/0143991 | A1 | * | 7/2003 | Minear et al. ................. 455/419 |
| 2003/0152366 | A1 | * | 8/2003 | Kanazawa et al. ............. 386/69 |
| 2003/0215224 | A1 | | 11/2003 | Yoo et al. |
| 2003/0229679 | A1 | * | 12/2003 | Yoo et al. ....................... 709/217 |
| 2004/0024818 | A1 | * | 2/2004 | Yoon et al. ..................... 709/204 |
| 2004/0024889 | A1 | * | 2/2004 | Getsin et al. ................... 709/229 |
| 2004/0067042 | A1 | * | 4/2004 | Hughes, Jr. ..................... 386/65 |
| 2005/0019007 | A1 | * | 1/2005 | Kato et al. ...................... 386/69 |

FOREIGN PATENT DOCUMENTS

| CN | 1279467 A | 1/2001 |
| KR | 1020030000106 A | 1/2003 |
| RU | 2 198 471 C2 | 2/2003 |
| WO | WO 99/33241 A1 | 7/1999 |
| WO | WO-02/05104 A1 | 1/2002 |
| WO | WO-02/15024 A1 | 2/2002 |
| WO | WO-02/37844 A1 | 5/2002 |
| WO | WO-03/096176 A1 | 11/2003 |

* cited by examiner

*Primary Examiner* — Scott Beliveau
*Assistant Examiner* — Mark Stanley
(74) *Attorney, Agent, or Firm* — Birch, Stewart, Kolasch & Birch, LLP

(57) ABSTRACT

The present invention relates to an interactive medium and a method for managing additional contents synchronously outputted with audio/video (A/V) data in an interactive digital versatile disk (I-DVD). A player in which an interactive disk is seated accesses a server providing the additional contents of the A/V data recorded on the interactive disk before the interactive disk is reproduced, and receives updated information of the additional contents from the server. The player refers to the received updated information and determines whether an arbitrary file contained in an additional content list associated with the A/V data has been updated. The player makes a request for an original file contained in the list or an updated file designated in the updated information, and receives the requested original or updated file. Therefore, the player can always receive additional contents containing the updated file. According to this operation, the server enables the additional contents to be conveniently updated.

27 Claims, 4 Drawing Sheets

INTERACTIVE MEDIUM AND METHOD FOR MANAGING ADDITIONAL DATA THEREOF

This Nonprovisional application claims priority under 35 U.S.C. §119(a) on Patent Application No(s). 10-2003-0014162 filed in KOREA on Mar. 6, 2003, the entire contents of which are hereby incorporated by reference.

1. TECHNICAL FIELD

The present invention relates to an interactive medium and a method for managing additional contents synchronously outputted with audio/video (A/V) data in an interactive digital versatile disk (I-DVD).

2. BACKGROUND ART

High-density optical disks capable of recording and storing large-capacity digital data, e.g., digital versatile disks (DVDs), have been widely supplied. The DVDs are large-capacity recording mediums capable of permanently recording and storing not only high-quality digital audio data, but also high-quality moving picture data.

A DVD includes a data stream recording area for recording a digital data stream such as moving picture data, and a navigation data recording area for recording navigation data needed for controlling a playback operation for the moving picture data.

Thus, a typical DVD player first reads the navigation data recorded on the navigation data recording area if the DVD is seated in the player, stores the read navigation data in a memory provided in the player, and reads and reproduces the moving picture data recorded on the data stream recording area using the navigation data.

The DVD player reproduces the moving picture data recorded on the DVD, such that a user can reproduce and view high-quality moving pictures recorded on the DVD, etc.

An interactive digital versatile disk (I-DVD) standardization work of which is recently ongoing is a DVD on which information (referred to as "control or additional contents" or "ENAV data") associated with the playback of audio/video (A/V) data recorded on the I-DVD, in the form of a file written in hypertext markup language (HTML) or Uniform Resource Identifiers (URIs) for the file, has been additionally recorded, and on which the A/V data recorded is reproduced according to the user's interactive request. Where I-DVDs are commercialized, the supply of contents through digital recording mediums will be more prevalent.

However, after the I-DVD on which additional contents or URIs for acquiring the additional contents are recorded, is manufactured once, it is difficult for corresponding additional contents to be updated. That is, in order for the additional contents to be appropriately updated, contents of files linked to the URIs recorded on the previously manufactured I-DVD must be updated. Furthermore, in order for the file contents to be appropriately updated, a back-up operation for previous version-based files must be carried out and the previous files must be deleted, and new files having previous file names are generated in relation to their URIs.

In this case, when the I-DVD is reproduced, a download request for the new files having the previous file names at the previous location is made, and new contents are acquired. However, there is a problem in that a back-up operation, a deletion operation and a new file generation operation are complex in relation to each file.

3. DISCLOSURE OF INVENTION

Therefore, the present invention has been made in view of the above problems, and it is an object of the present invention to provide an interactive medium and a method that can easily manage additional contents linked to audio/video (A/V) data recorded on the interactive medium.

In accordance with one aspect of the present invention, the above and other objects can be accomplished by the provision of a method for reproducing an interactive disk, comprising the steps of: (a) accessing a server providing additional contents of audio/video (A/V) data recorded on the interactive disk, and receiving updated information of the additional contents from the server; (b) referring to the received updated information and determining whether an arbitrary file contained in an additional content list associated with the A/V data has been updated; and (c) making a request for an original file contained in the list or an updated file designated in the updated information according to a result of the determination, and receiving the requested original or updated file.

In accordance with another aspect of the present invention, the above and other objects can be accomplished by the provision of a method for providing additional contents associated with audio/video (A/V) data recorded on an interactive disk, comprising the steps of: (a) receiving a download request for an arbitrary file configuring the additional contents from a player in which the interactive disk is seated; (b) referring to updated information of the additional contents and determining whether a file corresponding to the download request has been updated; and (c) reading and transmitting the file corresponding to the download request and an updated file designated in the updated information according to a result of the determination.

In accordance with yet another aspect of the present invention, the above and other objects can be accomplished by the provision of an interactive medium, comprising: moving picture data; and additional data having information related with the moving picture data in the form of a plurality of well-formed files, wherein the additional data constructs at least one additional content unit, each of the additional content units being reproduced seamlessly along with the moving picture data, and wherein at least one of said plurality of the well-formed files contains first information, a predetermined file being used for reproducing the additional content unit corresponding to the predetermined file according to the first information, the predetermined file being created in a markup language.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

Features, elements, and aspects of the invention that are referenced by the same numerals in different figures represent the same, equivalent, or similar features, elements, or aspects in accordance with one or more embodiments.

5. MODES FOR CARRYING OUT THE INVENTION

Now, an interactive medium and a method for managing additional contents in accordance with preferred embodiments of the present invention will be described in detail with reference to the annexed drawings.

Figure 1:
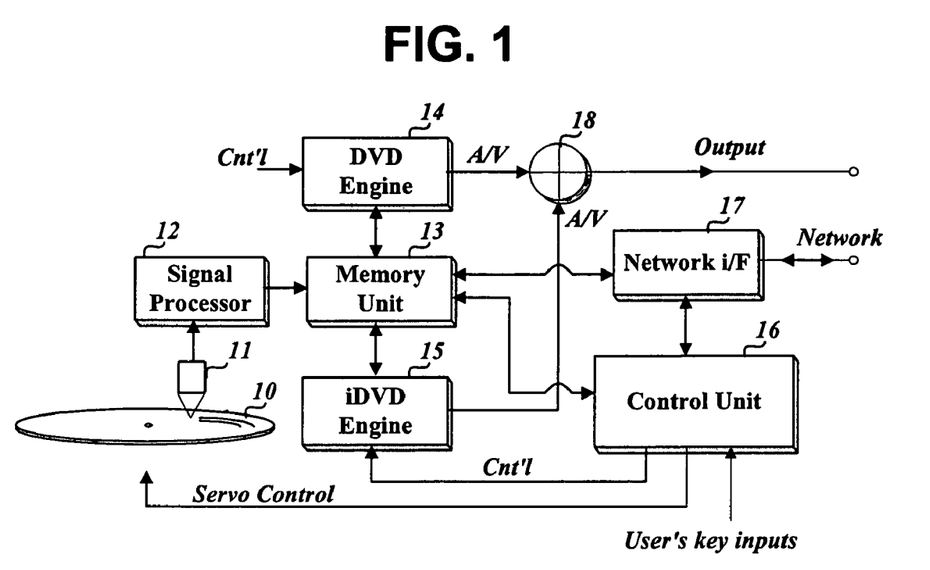
FIG. 1 is a block diagram illustrating the configuration of an optical disk device to which a method for managing additional data in accordance with the present invention is applied.

FIG. 1 is a block diagram illustrating the configuration of an optical disk device to which the method for managing additional contents is applied in accordance with the present invention is applied. In the optical disk device, an optical pickup 11 reads a signal recorded on an interactive digital versatile disk (I-DVD) 10. A signal processor 12 processes a read radio frequency (RF) signal and recovers digital data. A memory unit 13 stores the recovered data and externally received data. A DVD engine 14 decodes the data stored in the memory unit 13, and outputs an audio/video (A/V) signal. An iDVD engine 15 interprets information files stored in the memory unit 13, and processes necessary additional contents, i.e., ENAV data. A summer 18 sums the A/V signal from the DVD engine 14 and another A/V signal from the iDVD engine 15 and outputs a result of the summing. A network interface 17 performs a network connection function and a web browser function. A control unit 16 sets a playback environment of the I-DVD 10 and controls the above-described components so that data of the I-DVD 10 can be reproduced along with the additional contents, under the set playback environment.

Figure 2:
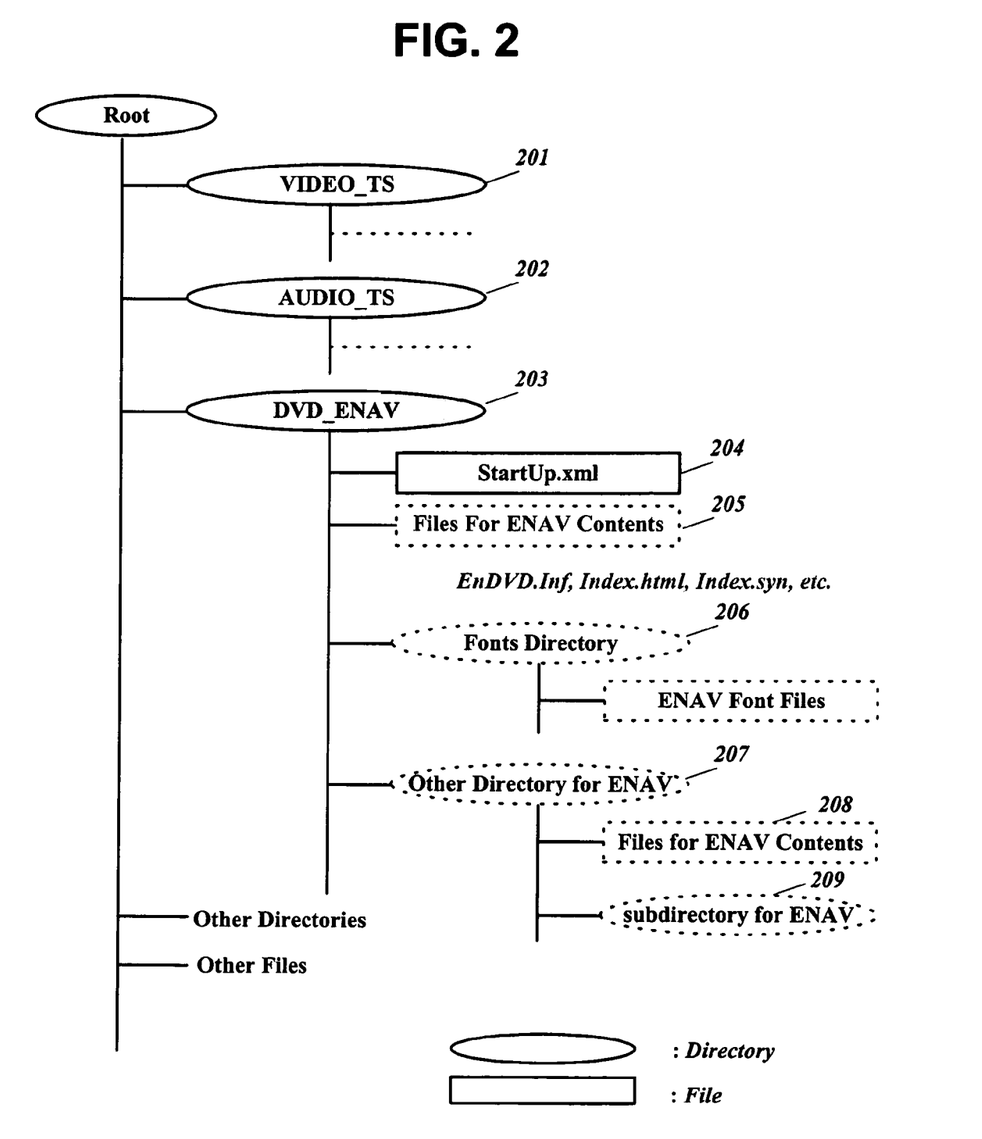
FIG. 2 is a schematic diagram illustrating a directory structure of an interactive digital versatile disk (I-DVD) in accordance with the present invention.

A directory structure of the I-DVD 10 is as shown in FIG. 2. An additional content directory "DVD_ENAV" 203 arranged under a root directory includes a start-up file "StartUp.xml" 204 containing information for system environment setting to be necessarily performed before data of the I-DVD is reproduced, an information file "EnDVD.Inf" required for reproducing A/V data recorded on the I-DVD, an initial screen setup file "index.html" for playback, a synchronization file "index.syn" for the synchronization between data units of different attributes, etc. The directory "DVD_ENAV" 203 further includes a fonts directory 206 storing font files required for outputting text of the additional contents, and an additional content directory 207 containing the additional contents for providing additional A/V contents, i.e., ENAV data files 208 (html files, image files, sound files, etc.). The additional content directory 207 can include additional contents, e.g., subdirectories 209, on the basis of a hierarchical structure.

A video title set directory "Video_TS" 201 containing video data and an audio title set directory "Audio_TS" 202 containing audio data are arranged under the root directory.

A disk version information and a content manufacturer information associated with the I-DVD are recorded in the "EnDvd.inf" file of the directory 203. In addition, uniform resource identifier (URI) information associated with a content provider's server for providing, through the Internet, the additional content information relating to A/V data to be read and reproduced from the I-DVD can be recorded in the directory 203.

Setup information for the initial screen setting at the time of reproducing the data of the interactive DVD are recorded in the setup file "index.html" of the directory 203. Time stamp information required for performing the synchronization between the A/V data to be read and reproduced from the I-DVD and ENAV data are recorded in the synchronization file "index.syn".

Moreover, various information units, for system environment setting, required to be performed before the A/V data of the I-DVD is reproduced are recorded in the start-up file "StartUp.xml". The various information units include information of all contents to be loaded into a memory before the playback or location information of a source for providing the content information, information of a parental ID indicating a right to access the recorded A/V data, information of language of the additional contents, information of limitation in web-site connection during the playback, memory management information, information of a file to be processed after the start-up file is processed, version information of the start-up file, etc. URI information of the additional content provider's server recorded in the "EnDvd.inf" file can also be recorded in the start-up file.

Figure 3:
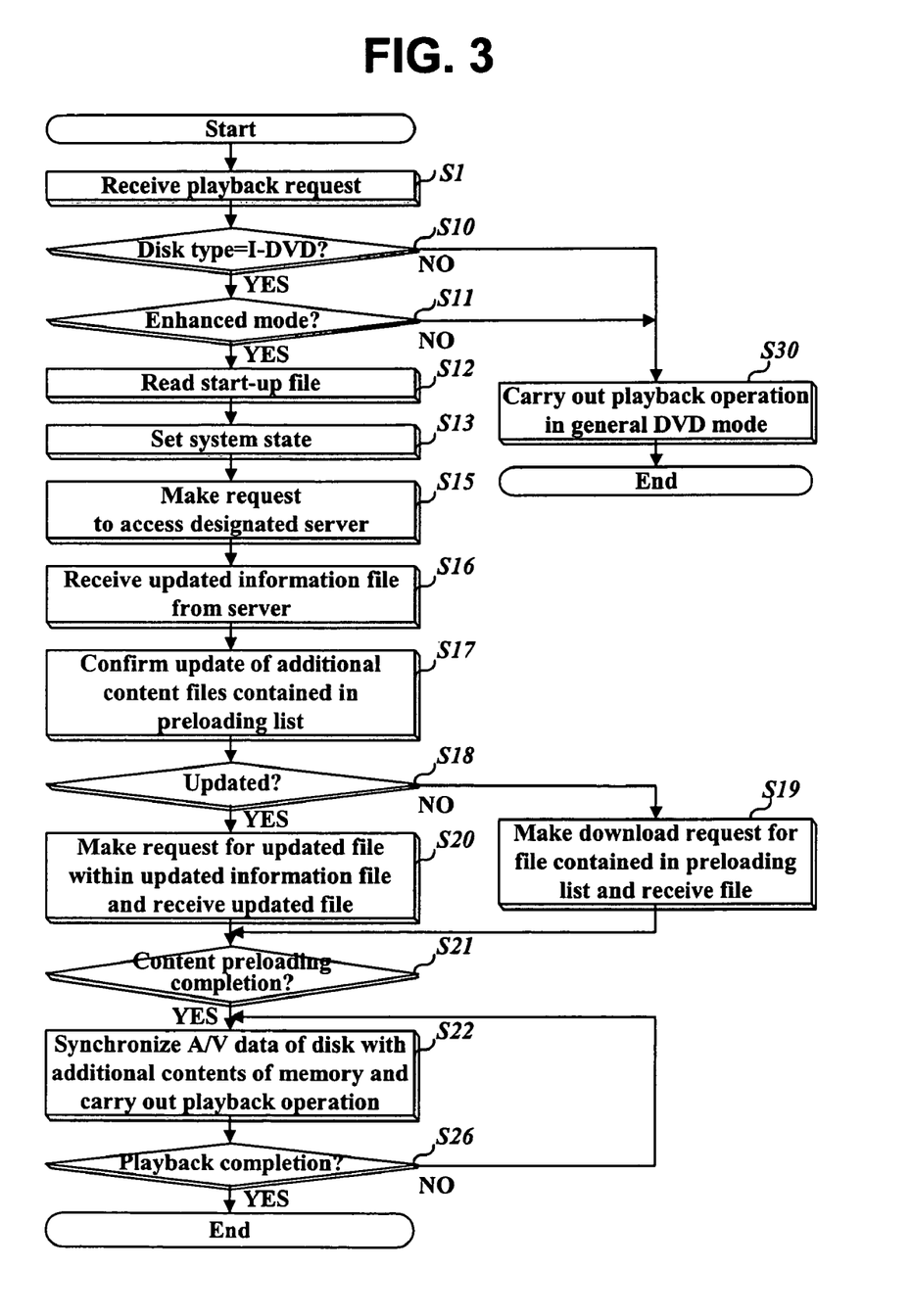
FIG. 3 is a flowchart illustrating a method for reproducing data of an interactive disk in accordance with a preferred embodiment of the present invention.

A process for reproducing data recorded on the I-DVD 10 will be described in detail with reference to a flowchart shown in FIG. 3.

If a disk is seated in the player shown in FIG. 1 at step S1, the control unit 16 searches for a "StartUp.xml" or "EnDVD.Inf" file from a "DVD_ENAV" directory. If a corresponding file is found, the seated disk is discriminated as an I-DVD at step S10. Otherwise, the seated disk is discriminated as a general DVD at the above step S10.

If the seated disk is the general DVD, the control unit 16 performs a playback operation in a general DVD mode in response to a user request at step S30. Then, if the playback operation is completed, a procedure ends. In the playback operation of the DVD mode, data reproduced from the disk is processed through the DVD engine 14 and the processed data is outputted as video and audio signals.

On the other hand, if the seated disk is an I-DVD, it is determined whether data of the I-DVD must be reproduced in an enhanced mode at step S11. The enhanced mode means a synchronous playback mode with the additional data, i.e., ENAV data. The enhanced mode can be set ON/OFF by the user, and an initially set state is the ON state. If the enhanced mode is in the OFF state, the above-described general DVD playback operation is performed at the above step S30, although the seated disk is an I-DVD.

If the enhanced mode is in the ON state, the start-up file "StartUp.xml" arranged under the "DVD_ENAV" directory is read at step S12, the read file is stored in the memory unit 13, and the iDVD engine 15 receives a request so that the read file can be interpreted. If so, the iDVD engine 15 interprets the start-up file "StartUp.xml" stored in the memory unit 13, confirms a parental ID as a level of a right to reproduce data of the I-DVD, a region code, etc. and sets a system state at step S13.

System state information includes information associated with language to be used at the time of processing the ENAV data, web-site connection limitation, memory management, etc.

Next, the iDVD engine 15 makes a request for a connection to a specific server through the network interface 17 at step S15. Location information of the specific server is confirmed from web-site connection limitation information of the start-up file or URI information recorded in the "EnDvd.inf" file. When the connection request is made, disk version information of the interactive disk is also transmitted. At this point, the disk version information contains interactive disk identification information. If A/V data recorded on the interactive disk is configured to correspond to a plurality of applications, and a plurality of additional content units are present, additional content unit numbers linked to the A/V data to be currently reproduced are transmitted instead of the disk version information or together with the disk version information.

A corresponding server receiving the connection request together with the disk version information (and/or the unit numbers) transmits a predetermined file associated with the disk version information (and/or the unit numbers) to the disk device making the connection request for the predetermined file at step S16.

At this point, the transmitted file is a file created in language interpretable by the iDVD engine 15, for example, an html or xml file. Furthermore, the transmitted file contains updated information of files configuring the additional contents of the current interactive disk.

A name of the file is, for example, "iDVD_Contents_Unit?.xml" (where "?" denotes a unit number). Its contents can be created as in the following format, and an updated file contains a history.

```
<XML>
<UNIT Index=? able="TRUE"></UNIT>
<PAGE seq=1>
<DATA name="name" able="TRUE">
<INDEX>2th</INDEX>
<TYPE>Audio</TYPE>
<ORIGIN>http://www.disney.com/dream/u1/memo.mp3</ORIGIN>
<SRC>http://www.disney.com/dream/u1/memo_v2.mp3</SRC>
<SRCIsLast=FALSE>http://www.disney.com/dream/u1/memo_v3.mp3
</SRC>
<SRCIsLast=TRUE>http://www.disney.com/dream/u1/memo_v4.mp3
</SRC>
</DATA>
.....................
</PAGE>
.....................
<PAGE seq=n>
</PAGE>
</XML>
```

When the file created in the above-described format is received through the network interface 17, the iDVD engine 15 interprets the contents of the received file and determines currently updated files. In the above-described example, the iDVD engine 15 recognizes that a "memo.mp3" file linked to a URI of "http://www.disney.com/dream/u1" has been updated three times, and that the latest version file is "memo_v4.mp3" present at the previous location.

Content unit contained in each <DATA> tag is interpreted according to the same method and hence all updated information units are confirmed.

After the received updated information file of "iDVD_Contents_Unit?.xml" is completely interpreted, the iDVD engine 15 interprets a preloading list contained in the start-up file, and hence stores necessary ENAV data (of an html, image, sound or text file, etc.) in a memory space.

The preloading list can be defined as in the following format.

```
<unit no="1">
<DATA name="aaa" able="TRUE">
<INDEX>2th</INDEX>
<TYPE>doc</TYPE>
<src t_lang="all">http://www.disney.com/a/b.htm </src>
</DATA>
<DATA name="bbb" able="TRUE">
<INDEX>2th</INDEX>
<TYPE>Audio</TYPE>
```

-continued

```
<src >http://www.disney.com/dream/u1/memo.mp3 </src>
</DATA>
.....................
</unit>
.....................
</preload>
```

In the above-described example, a unit means a section in which ENAV data and A/V data associated with the ENAV data must be seamlessly reproduced. As described above, all A/V data recorded on the interactive disk, that is, titles, can be linked to one or more ENAV units. An additional content item to be preloaded for each unit, that is, an ENAV data item, is defined in the <DATA> tag contained in the unit. In the above example, the file "http://www.disney.com/a/b.htm" is first loaded into the memory unit 13.

Before the file is loaded into the memory 13, the iDVD engine 15 determines whether a corresponding file is contained in previously interpreted updated information at step S17. If the file "http://www.disney.com/a/b.htm" is not contained in the updated information at step S18, a file contained in the preloading list is downloaded and the downloaded file is stored in the memory unit 13.

If a file to be loaded is contained in the updated information, as the file "http://www.disney.com/u1/memo.mp3" within the next <DATA> tag, at the above step S18, a download request for the file is not made. At step S20, a download request for a file of "http://www.disney.com/dream/u1/memo_v4.mp3" corresponding to an updated version within an updated information file is made. Upon receiving the file, the memory unit 13 stores the received file. If it is determined that the latest version file cannot be currently accommodated, according to the current disk version information, a download request for a lower version file than the latest version file, that is, a file "memo_v3.mp3" or "memo_v2.mp3", is made, and the downloaded file is stored in the memory unit 13.

If a preloading process associated with each <DATA> tag is carried out according to the above-described method, the memory unit 12 stores updated additional contents and a loading operation for all additional contents or one additional content unit is completed at step S21.

Figure 4A:
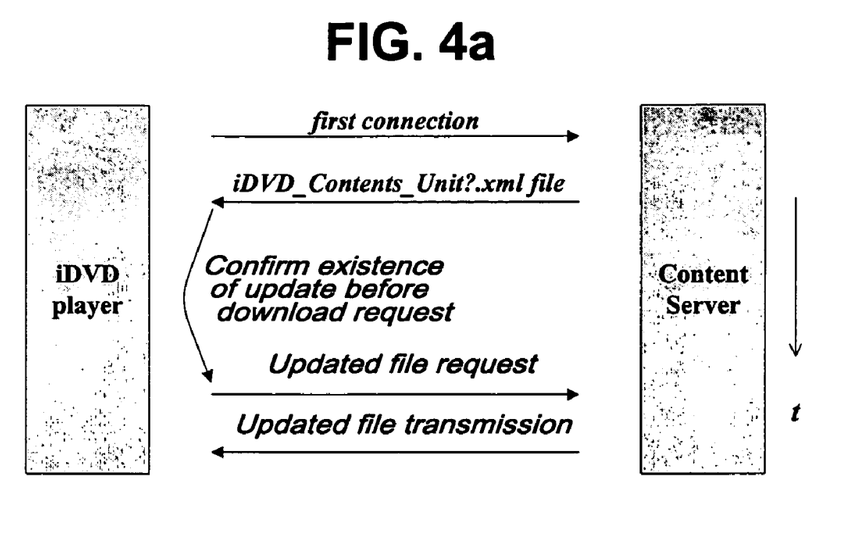
FIGS. 4a and 4b are explanatory views illustrating a process for enabling a player to obtain updated data for additional contents from a server in accordance with the present invention.

FIG. 4a shows a main procedure for preloading a file updated through the above-described process to the disk device.

The above-described embodiment in which the disk device confirms the existence of updated content file and then transmits a download request to the server has been described. However, the server can confirm the existence of updated content file corresponding to the download request and download the updated content file to the disk device.

Of course, all updated information units are recorded in an updated information file "iDVD_Contents_Unit?.xml". The server determines whether the content file corresponding to the download request has been updated according to information of the updated information file.

Figure 4B:
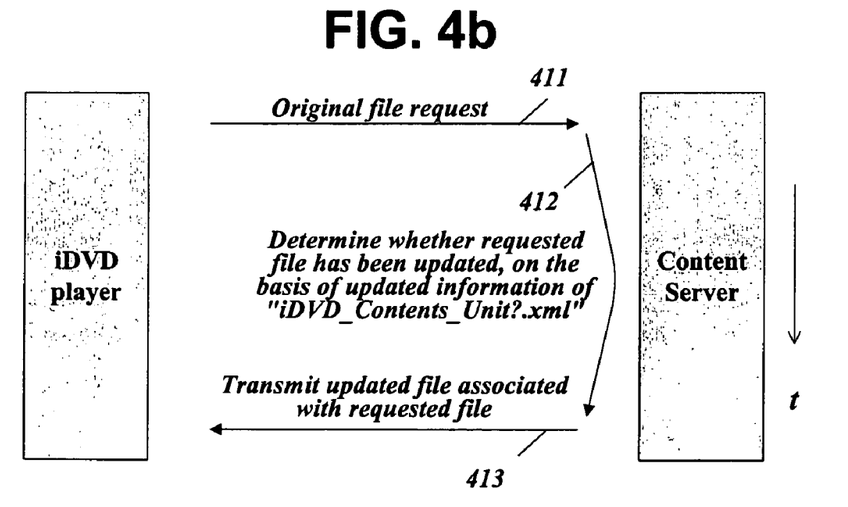

FIG. 4b shows a process for enabling the server to determine the existence of updated content file.

For example, when the iDVD engine 15 of the disk device requests that a corresponding server transmit one of the files designated in a preloading list within the start-up file, that is, a file "memo.mp3", at step 411, the updated information file recorded in the server, that is, the file "iDVD_Contents_Unit?.xml" (which is decided based upon the disk version information and/or information specifying additional contents unit previously received), is checked and it is determined whether a requested file has been updated at step 412. If the requested file has been updated, the latest version file of "memo_v4.mp3" is transmitted at step 413. Otherwise, an original file corresponding to the request is transmitted.

If it is determined that the latest version file cannot be accommodated according to disk version information provided before an additional content file is downloaded, a corresponding server can transmit a version of the file (e.g., a file "memo_v3.mp3" or "memo_v2.mp3") lower than the latest version file.

The iDVD engine 15 confirms, from the start-up file, a designated file (conventionally corresponding to the setup file "index.html") to be executed after the start-up file. The iDVD engine 15 requests that the control unit 16 read the designated file from the I-DVD 10. When the setup file based on the request is loaded into the memory unit 13, the iDVD engine 15 interprets the file and configures and outputs a user selection initial screen.

When the user selects a "playback start" item on the initial screen, the control unit 16 buffers A/V data reproduced from the seated I-DVD 10 in the memory unit 13 while driving the I-DVD 10. The buffered A/V data is decoded by the DVD engine 14 and an A/V signal is outputted according to a result of the decoding. In the course of this operation, the iDVD engine 15 reads updated ENAV data preloaded into the memory unit 13, and, if desired, decodes the read ENAV data and outputs an A/V signal. The A/V signal from the iDVD engine 15 is combined with an output signal from the DVD engine 14, and a result of the combining is externally outputted at step S22.

The iDVD engine 15 refers to synchronous information (e.g., linkage information of a file name and time information) recorded in a synchronization file "index.syn" so that files configuring ENAV data can be outputted synchronously with A/V data reproduced from the interactive disk. When a higher version list than a preloading list designated in the start-up file "StartUp.xml" recorded in the I-DVD 10 is received from the remote server, a synchronization file "index.syn" is also received. The received synchronization file "index.syn" can be used in place of the synchronization file "index.syn" recorded on the I-DVD 10.

The above-described operation is continuously carried out before the playback operation of the interactive disk is completed or a playback stop request is received from the user at step S26.

As apparent from the above description, the present invention provides an interactive medium and a method for managing additional data of the interactive medium that can equally maintain a directory or file name associated with an updated file when only the updated information file is created, and that can use a previous version file linked to a corresponding uniform resource identifier (URI) after an update operation in case the interactive disk is incompatible with the updated file, such that additional data of the interactive disk can be easily and conveniently updated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for reproducing additional contents associated with Audio/Video (A/V) data included on a detachable optical disk, the method comprising:
   determining whether a reproduction mode is an enhanced mode for playing back the additional contents with the A/V data;
   accessing a server for providing the additional contents associated with the A/V data recorded on the detachable optical disk, and receiving updated information of the additional contents from the server when the reproduction mode is determined to be the enhanced mode, said additional contents not being a replacement or updated version of the A/V data but being information for the A/V data;
   determining whether an arbitrary file contained in an additional content list associated with the A/V data has been updated, based on the received updated information, the version of the detachable optical disk being a non-hardware version; and
   making a request for an original file contained in the list or an updated file identified in the updated information according to a result of determining whether the arbitrary file has been updated, and receiving the requested original or updated file,
   wherein the step of determining whether the arbitrary file contained in the additional content list associated with the A/V data has been updated includes
   analyzing the received updated information for the arbitrary file and determining a version number of the arbitrary file identified in the received updated information,
   determining if a latest version of the arbitrary file can be accommodated according to a current version of the detachable optical disk, and
   if the latest version of the arbitrary file can not be accommodated according to the current version of the detachable optical disk, selecting a next lower version of the arbitrary file to be included in the request, and
   wherein the step of receiving the requested original or updated file further receives a new synchronization file to synchronize the updated file with the A/V data when receiving the updated file, the new synchronization file replacing an original synchronization file read before a playback operation from the detachable optical disk.

2. The method as set forth in claim 1, wherein the receiving the updated information is performed at the time of first accessing the server.

3. The method as set forth in claim 1, wherein the updated information contains information about an original file and updated version files associated with the updated file.

4. The method as set forth in claim 1, wherein the updated information is a markup language file created in a text format.

5. The method as set forth in claim 1, wherein the additional content list is recorded in a start-up file to be first read before the playback operation, the start-up file being recorded on the detachable optical disk.

6. The method as set forth in claim 1, wherein one updated information unit of the additional contents is decided based on specific information of the detachable optical disk and/or information specifying additional contents, and the decided information unit is received from the server.

7. The method as set forth in claim 1, further comprising:
   when additional contents, corresponding to a predetermined data amount, containing the updated file are received, sequentially synchronizing the additional contents with the A/V data reproduced from the detachable optical disk based on the new synchronization file and performing a presentation operation.

8. A method for providing additional contents associated with audio/video (A/V) data recorded on a detachable optical disk, the method comprising:
receiving a download request for an arbitrary file configuring the additional contents from a player in which the detachable optical disk is seated and in which a reproduction mode is set as an enhanced mode for playing back the additional contents with the A/V data, said additional contents not being a replacement or updated version of the A/V data but being information for the A/V data;
determining a version number of the arbitrary file corresponding to the download request, based on updated information of the additional contents; and
transmitting the file corresponding to the download request or an updated file designated in the updated information according to a result of the determination,
wherein the step of determining the version number includes
analyzing the received updated information for the arbitrary file and determining the version number of the arbitrary file identified in the received updated information,
determining if a latest version of the arbitrary file can be accommodated according to a current version of the detachable optical disk, the version of the detachable optical disk being a non-hardware version, and
if the latest version of the arbitrary file can not be accommodated according to the current version of the detachable optical disk, selecting a lower version of the arbitrary file to be included in the request, and
wherein the step of transmitting the file further transmits a new synchronization file to synchronize the updated file with the A/V data when transmitting the updated file, the new synchronization file being to replace an original synchronization file first read before a playback operation from the detachable optical disk.

9. The method as set forth in claim 8, wherein the updated information contains information about an original file and updated version files associated with the updated file.

10. The method as set forth in claim 8, wherein the updated information is a markup language file created in a text format.

11. The method as set forth in claim 8, further comprising:
specifying updated information based on specific information of the detachable optical disk and/or information specifying additional contents received from the player so that an existence of the updated file can be determined, and referring to the specified updated information.

12. An apparatus for reproducing a detachable optical disk including audio/video (A/V) data, the apparatus comprising:
a control unit configured to determine whether a reproduction mode is an enhanced mode for playing back the additional contents with the A/V data; and
a network interface configured to access a server providing additional contents associated with the A/V data, and to receive updated information of the additional contents from the server when the control unit determines the reproduction mode is the enhanced mode, said additional contents not being a replacement or updated version of the A/V data but being information for the A/V data,
wherein the control unit is further configured to refer to the received updated information, to determine a version number of an arbitrary file contained in an additional content list associated with the A/V data, to make a request for an original file contained in the list or an updated file identified in the updated information according to a result of the determination, and to receive the requested original or updated file,
wherein the control unit is further configured
to analyze the received updated information for the arbitrary file to determine the version number of the arbitrary file identified in the received updated information,
to determine if a latest version of the arbitrary file can be accommodated according to a current version of the detachable optical disk, the version of the detachable optical disk being a non-hardware version, and
if the latest version of the arbitrary version can not be accommodated according to the current version of the detachable optical disk, to select a lower version of the arbitrary file to be included in the request, and
wherein the controller is further configured to receive a new synchronization file to synchronize the updated file with the A/V data when receiving the updated file, the new synchronization file replacing an original synchronization file first read before a playback operation from the detachable optical disk.

13. The apparatus as set forth in claim 12, wherein the network interface is configured to receive the updated information at the time of first accessing the server, according to a control of the control unit.

14. The apparatus as set forth in claim 12, wherein the updated information contains information about an original file and updated version files associated with the updated file.

15. The apparatus as set forth in claim 12, wherein the updated information is a markup language file created in a text format.

16. The apparatus as set forth in claim 12, wherein the additional content list is recorded in a start-up file to be first read before the playback operation, the start-up file being recorded on the detachable optical disk.

17. The apparatus as set forth in claim 12, wherein the control unit is configured to decide one updated information unit of the additional contents based on specific information of the detachable optical disk and/or information specifying additional contents, and the decided information unit is received from the server via the network interface.

18. The apparatus as set forth in claim 12, wherein the control unit is further configured to sequentially synchronize the additional contents with the A/V data reproduced from the detachable optical disk based on the new synchronization file and perform a presentation operation, when additional contents corresponding to a predetermined data amount containing the updated file are received.

19. The method as set forth in claim 1, wherein further comprising:
selecting the latest version of the arbitrary file identified in the received updated information if the latest version can be accommodated according to the current version of the detachable optical disk.

20. The method as set forth in claim 1, further comprising:
requesting the updated file identified in the received updated information when there is the updated version of the arbitrary file and requesting the original file corresponding to the arbitrary file when there is no update version of the arbitrary file.

21. The method as set forth in claim 8, further comprising:
selecting the latest version of the arbitrary file identified in the received updated information if the latest version can be accommodated according to the current version of the detachable optical disk.

22. The method as set forth in claim 8, further comprising:
transmitting the updated file identified in the received updated information when there is the updated version of the arbitrary file and transmitting the original file corresponding to the arbitrary file when there is no update version of the arbitrary file.

23. The apparatus as set forth in claim 12, wherein the control unit is further configured to select the latest version of the arbitrary file identified in the received updated information if the latest version can be accommodated according to the current version of the detachable optical disk.

24. The apparatus as set forth in claim 12, wherein the control unit is further configured to request the updated file identified in the received updated information when there is the updated version of the arbitrary file and to request the original file corresponding to the arbitrary file when there is no update version of the arbitrary file.

25. The method as set forth in claim 1, wherein the step of determining if the latest version can be accommodated determines if the latest version can be accommodated based on only the current version of the detachable optical disk.

26. The method as set forth in claim 8, wherein the step of determining if the latest version can be accommodated determines if the latest version can be accommodated based on only the current version of the detachable optical disk.

27. The apparatus as set forth in claim 12, wherein the controller is further configured to determine if the latest version can be accommodated based on only the current version of the detachable optical disk.

* * * * *